(12) United States Patent
Valascho et al.

(10) Patent No.: US 8,751,102 B2
(45) Date of Patent: Jun. 10, 2014

(54) VEHICLE READY LIGHT CONTROL METHOD AND SYSTEM

(75) Inventors: Joseph Francis Valascho, Utica, MI (US); Jamala Massenburg, Charlottesville, VA (US); Raymond C. Siciak, Redmond, WA (US); Dino H Candela, Canton, MI (US); Michael L. Gusta, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 591 days.

(21) Appl. No.: 12/421,868

(22) Filed: Apr. 10, 2009

(65) Prior Publication Data

US 2010/0262337 A1    Oct. 14, 2010

(51) Int. Cl.
*B60Q 1/00* (2006.01)

(52) U.S. Cl.
USPC ............... 701/36; 701/99; 340/438; 340/457; 116/28 R

(58) Field of Classification Search
USPC ............ 701/1, 22, 36, 99; 340/438, 439, 457, 340/459; 116/28.1, 28 R
See application file for complete search history.

(56) References Cited

U.S. PATENT DOCUMENTS

| | | | |
|---|---|---|---|
| 3,733,583 A * | 5/1973 | Ukai | 362/473 |
| 3,900,831 A * | 8/1975 | Houseman et al. | 340/459 |
| 4,570,226 A * | 2/1986 | Aussedat | 701/123 |
| 5,070,808 A * | 12/1991 | Poskie | 116/28.1 |
| 5,696,483 A * | 12/1997 | Khalid et al. | 340/456 |
| 6,007,451 A | 12/1999 | Matsui et al. | |
| 6,018,294 A * | 1/2000 | Vogel et al. | 340/456 |
| 6,166,631 A | 12/2000 | Kennedy et al. | |
| 6,317,665 B1 | 11/2001 | Tabata et al. | |
| 6,341,883 B1 * | 1/2002 | Kraxner | 362/489 |
| 6,480,106 B1 * | 11/2002 | Crombez et al. | 340/461 |
| 6,581,707 B2 | 6/2003 | Morimoto et al. | |
| 6,751,535 B2 | 6/2004 | Mori | |
| 7,091,839 B2 | 8/2006 | Situ et al. | |
| 2005/0200463 A1 | 9/2005 | Situ et al. | |
| 2006/0231011 A1 * | 10/2006 | Kamimura et al. | 116/28.1 |
| 2007/0102930 A1 * | 5/2007 | Koike et al. | 290/18 |

FOREIGN PATENT DOCUMENTS

| | | | |
|---|---|---|---|
| JP | 2007-118641 | * | 5/2007 |
| JP | 2007-125921 | * | 5/2007 |

\* cited by examiner

*Primary Examiner* — Paul N Dickson
*Assistant Examiner* — George Spisich
(74) *Attorney, Agent, or Firm* — David Kelley, Esq; Tung & Associates

(57) ABSTRACT

A vehicle ready light control method includes providing a vehicle having a vehicle ready light and illuminating the vehicle ready light when a powertrain of the vehicle is enabled and at least one of the following conditions exists: the vehicle is in park mode or neutral mode; an engine RPM speed of the vehicle is below a predetermined RPM value and a wheel speed of the vehicle is below a predetermined wheel speed. A vehicle ready light control system is also disclosed.

20 Claims, 2 Drawing Sheets

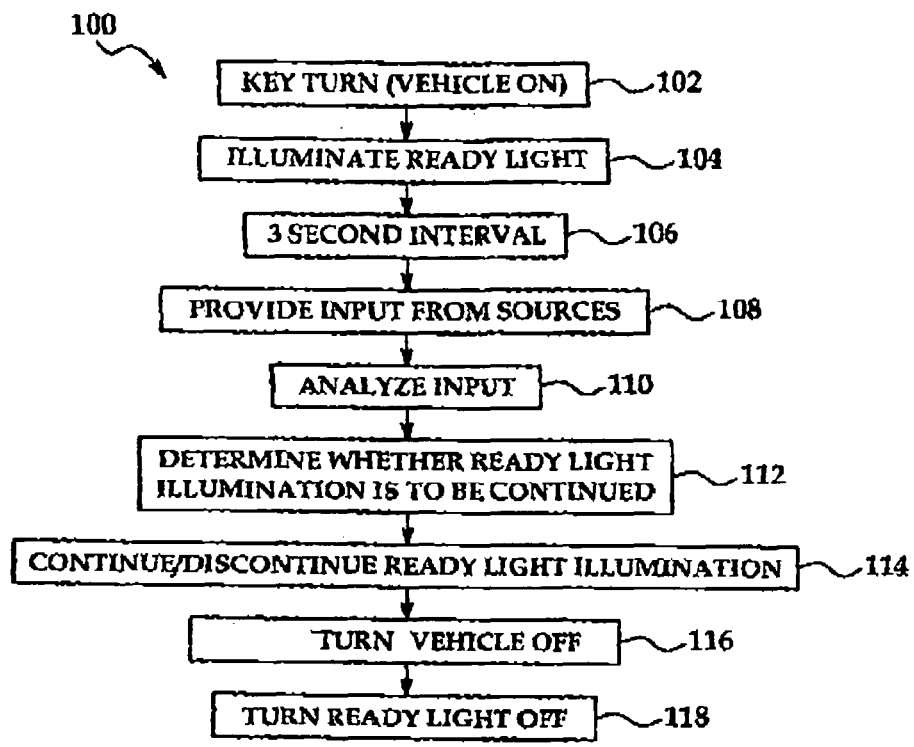
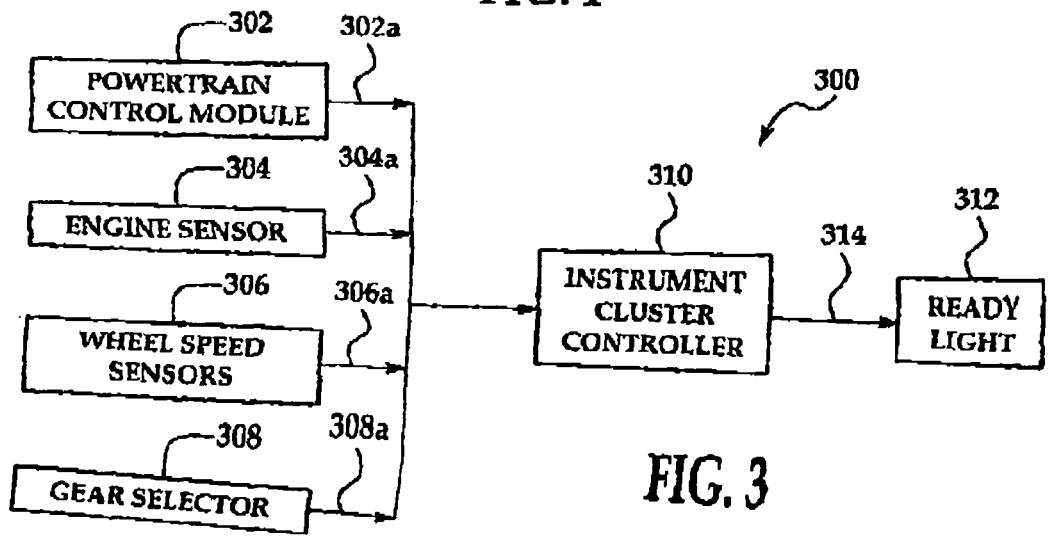

VEHICLE READY LIGHT CONTROL METHOD AND SYSTEM

TECHNICAL FIELD OF THE INVENTION

The present disclosure relates to a vehicle ready light which indicates whether a hybrid electric vehicle is ready for operation. More particularly, the present disclosure relates to a vehicle ready light control method and system which determines whether a vehicle ready light is illuminated.

BACKGROUND OF THE INVENTION

Hybrid electric vehicles (HEVs) may include a vehicle ready light which is illuminated to indicate to a driver of the vehicle that the vehicle is ready to be operated. The light may be illuminated whenever the hybrid powertrain (either the engine or the electric traction drive) is enabled. A signal from the Powertrain Control Module indicates that the vehicle has been started by the driver and initiates and sustains illumination of the vehicle ready light, which remains illuminated until the vehicle ignition key is turned off. The purpose of the light is to warn the driver that, absent the noise and vibration of the engine, the vehicle is still operational and therefore, when the vehicle is placed into drive and the brake is released, the vehicle will move forward. However, the vehicle ready light may remain illuminated continually and annoy the driver, particularly at night. Moreover, because the vehicle ready light is on continually, the safety function of the light may be ignored as the light fades into the driver's background consciousness.

Therefore, a vehicle ready light control method and system which determines whether a vehicle ready light is illuminated is needed.

SUMMARY OF THE INVENTION

The present disclosure is generally directed to a control method for a vehicle ready light of a vehicle. An illustrative embodiment of the control method includes providing a vehicle having a vehicle ready light and illuminating the vehicle ready light when a powertrain of the vehicle is enabled and at least one of the following conditions exists: the vehicle is in park mode or neutral mode; an engine RPM speed of the vehicle is below a predetermined RPM value and a wheel speed of the vehicle is below a predetermined wheel speed.

The present disclosure is further generally directed to a vehicle ready light control system. An illustrative embodiment of the system includes a powertrain control module; at least one of an engine sensor, wheel speed sensors and a gear selector; an instrument cluster controller interfacing with the powertrain control module and the engine sensor, wheel speed sensors and/or gear selector; and a vehicle ready light interfacing with the instrument cluster controller. The instrument cluster controller is adapted to receive a powertrain enablement signal from the powertrain control module and at least one of an engine RPM signal from the engine sensor, a wheel speed indication signal from the wheel speed sensors and a gear selector signal from the gear selector. The instrument cluster controller is adapted to illuminate the vehicle ready light when the powertrain enablement signal is received from the powertrain control module and at least one of the following conditions exists: The engine RPM signal indicates an engine RPM below a predetermined RPM value, the wheel speed indication signal indicates a wheel speed below a predetermined wheel speed value and the gear selector signal indicates a vehicle park mode or a vehicle neutral mode.

BRIEF DESCRIPTION OF THE DRAWINGS

The disclosure will now be made, by way of example, with reference to the accompanying drawings, in which:

FIG. 1 is a flow diagram which illustrates an illustrative embodiment of a vehicle ready light control method;

FIG. 3 is a block diagram of an illustrative embodiment of a vehicle ready light control system.

DETAILED DESCRIPTION OF THE PREFERRED EMBODIMENT

Figure 2:
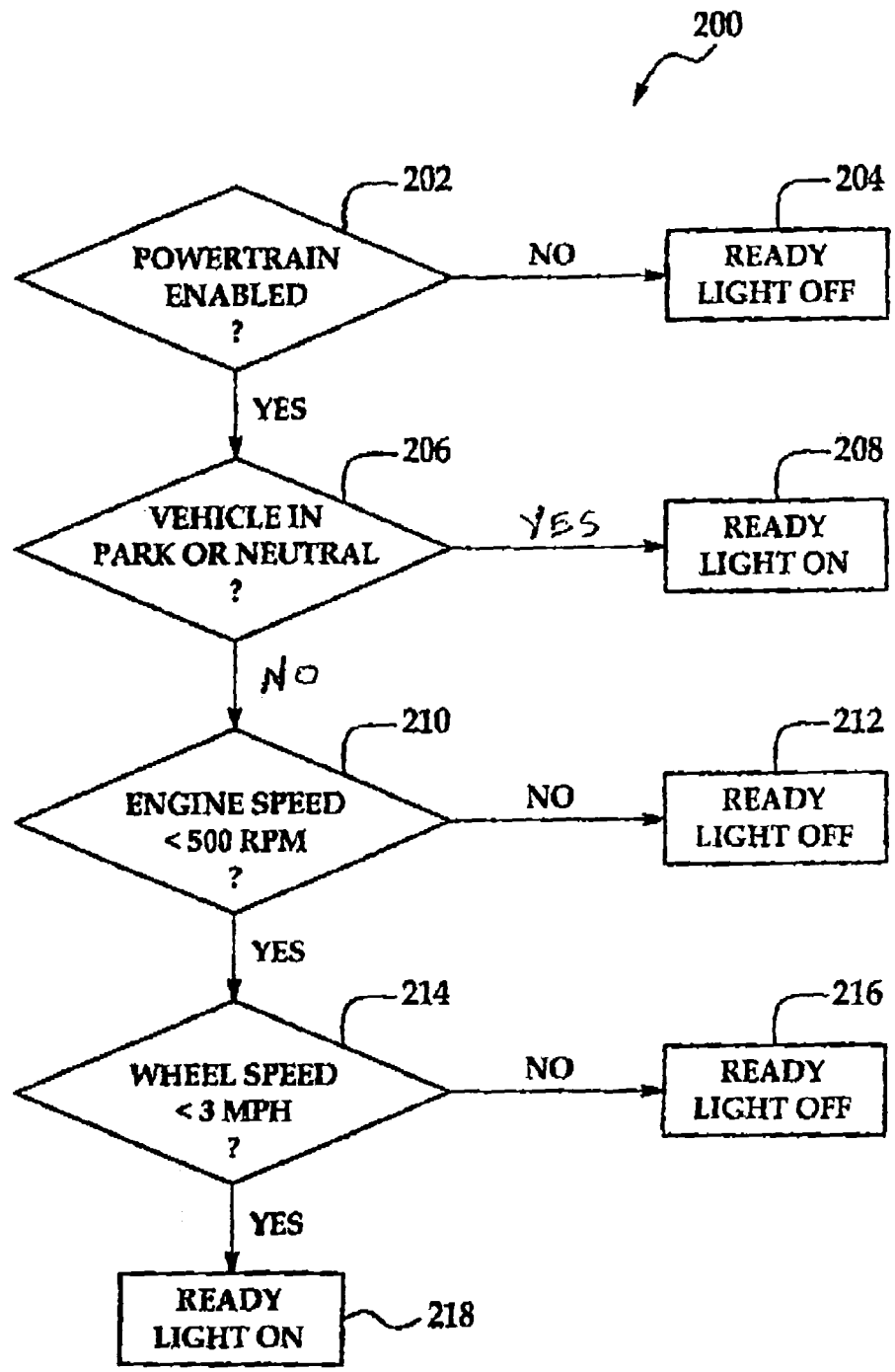
FIG. 2 is a flow diagram which illustrates an illustrative control algorithm suitable for implementation of an illustrative embodiment of the vehicle ready light control method.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the disclosure and are not intended to limit the scope of the disclosure, which is defined by the claims. Furthermore, there is no intention to be bound by any expressed or implied theory presented in the preceding technical field, background, brief summary or the following detailed description.

Referring initially to FIGS. 1 and 2, a flow diagram 100 which illustrates an illustrative embodiment of a vehicle ready light control method is shown in FIG. 1. An illustrative control algorithm 200 which is suitable for implementation of an illustrative embodiment of the vehicle ready light control method 100 is shown in FIG. 2. In block 102 of the flow diagram 100 in FIG. 1, a vehicle such as a hybrid electric vehicle (HEV) may be turned on such as by turning of an ignition key, for example and without limitation. In block 104, a vehicle ready light is illuminated. In block 106, a three-second or other time interval may elapse.

In block 108, input from multiple sources may be provided. The input may include a powertrain enablement signal which is provided by a Powertrain Control Module (PCM) of the vehicle and indicates enablement of the powertrain of the vehicle. The input may additionally include any combination of the following: an engine RPM signal which is provided by an engine sensor of an engine (which may be powered by gasoline, diesel, liquid natural gas or other fuel) of the vehicle and indicates the engine RPM of the engine; a wheel speed indication signal which is provided by wheel speed sensors of the vehicle and indicates the forward speed of the vehicle; and a gear selector signal which is provided by a gear selector of the vehicle and indicates whether the vehicle is in park, neutral, drive or reverse mode.

In block 110, the input from the multiple sources may be analyzed in a manner which will be hereinafter described. In block 112, based on analysis of the input which was made in block 110, a determination may be made as to whether illumination of the vehicle ready illumination light is to be continued. In block 114, illumination of the vehicle ready light may be continued or discontinued based on the determination which was made in block 112. In block 116, the vehicle may ultimately be turned off such as by turning of the ignition key, for example and without limitation. In block 118, the vehicle ready light is turned off if the vehicle ready light was illuminated upon turning of the vehicle off in block 116.

Analysis of the input from the various sources in block 110 of the flow diagram 100 in FIG. 1 may be implemented according to the algorithm 200 which is shown in FIG. 2. In block 202, a determination is made as to whether the powertrain of the vehicle is enabled. The powertrain is typically enabled upon turning of the vehicle on in block 102 of FIG. 1. If the powertrain of the vehicle is not enabled, the vehicle ready light is turned off in block 204. If the powertrain of the vehicle is enabled, one or more additional determinations may be made to determine whether the vehicle ready light is illuminated.

In block 206, a determination may be made as to whether the vehicle is in either park or neutral mode. If the vehicle is in either park or neutral, the vehicle ready light may be illuminated in block 208. If the vehicle is not in either park or neutral, a determination may be made as to whether the engine speed RPM of the engine of the vehicle is less than a predetermined rpm value (such as 500 rpm, for example and without limitation), in block 210. If the engine speed RPM is not less than the predetermined RPM value, the vehicle ready light may be turned off in block 212. If the engine speed RPM is less than the predetermined RPM value, a determination may be made as to whether the wheel speed of the vehicle is less than a predetermined wheel speed value (such as 3 mph, for example and without limitation) in block 214. If the wheel speed is not less than the predetermined wheel speed value, the vehicle ready light may be turned off in block 216. If the wheel speed is less than the predetermined wheel speed value, the vehicle ready light may be turned on in block 218.

Referring next to FIG. 3, a block diagram 300 which illustrates an illustrative embodiment of a vehicle ready light control system, hereinafter system, is shown. The system 300 includes a powertrain control module 302 of a hybrid electric vehicle (HEV), for example and without limitation. The system 300 may further include at least one of an engine sensor 304, wheel speed sensors 306 and a gear selector 308. An instrument cluster controller 310 may interface with the powertrain control module 302, the engine sensor 304, the wheel speed sensors 306 and the gear selector 308. A vehicle ready light 312 may interface with the instrument cluster controller 310.

In the system 300, the powertrain control module 302 is adapted to transmit a powertrain enablement signal 302a to the instrument cluster controller 310 in the event that the powertrain (not shown) of the vehicle is enabled. The engine sensor 304 may be adapted to transmit an engine RPM signal 304a, which indicates the RPM of an engine (not shown) of the vehicle, to the instrument cluster controller 310. The wheel speed sensors 306 may be adapted to transmit a wheel speed indication signal 306a which indicates the wheel speed of the vehicle (not shown) to the instrument cluster controller 310. The gear selector 308 may be adapted to transmit a gear selector signal 308a which indicates whether the vehicle is in a park mode, a neutral mode, a forward drive mode or a reverse mode to the instrument cluster controller 310. Responsive to receiving the powertrain enablement signal 302a and at least one of the engine RPM signal 304a, the wheel speed indication signal 306a and the gear selector signal 308a, the instrument cluster controller 310 may be adapted to analyze the signals and determine whether or not to illuminate the vehicle ready light 312 via a vehicle light activation signal 314 as will be hereinafter described.

In an exemplary implementation of the system 300, if the powertrain (not shown) of the vehicle is not enabled, the powertrain control module 302 may not transmit a powertrain enablement signal 302a to the instrument cluster controller 310. In that case, the instrument cluster controller 310 may maintain the vehicle ready light 312 in an "off" state. If, on the other hand, the powertrain of the vehicle is enabled, the powertrain control module 302 may transmit a powertrain enablement signal 302a to the instrument cluster controller 310.

The instrument cluster controller 310 may next determine whether the vehicle is in park, neutral, forward or reverse mode. If the gear selector signal 308a which is received from the gear selector 308 indicates that the vehicle is in either park mode or neutral mode, the instrument cluster controller 310 may illuminate the vehicle ready light 312 via the vehicle light activation signal 314. If on the other hand the gear selector signal 308a indicates that the vehicle is not in either park mode or neutral mode, the instrument cluster controller 310 may determine whether the RPM of the engine (not shown) of the vehicle is below a predetermined RPM value. If the engine RPM signal 304a which is received from the engine sensor 304 indicates that the RPM of the engine does not fall below a predetermined RPM value (such as 500 rpm, for example and without limitation), the instrument cluster controller 310 may maintain the vehicle ready light 312 in the "off" state.

On the other hand, if the RPM of the engine does fall below the predetermined RPM value, the instrument cluster controller 310 may next determine whether the wheel speed of the vehicle is below a predetermined wheel speed. If the wheel speed indication signal 306a indicates that the wheel speed of the vehicle does not fall below the predetermined wheel speed, the instrument cluster controller 310 may maintain the vehicle ready light 312 in the "off" state. On the other hand, if the wheel speed indication signal 306a indicates that the wheel speed of the vehicle does fall below the predetermined wheel speed, the instrument cluster controller 310 may illuminate the vehicle ready light 312 via the vehicle ready light activation signal 314.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A control method for a vehicle ready light of a vehicle, said vehicle ready light indicating whether said vehicle is ready to be operated, comprising the steps of:
    illuminating said vehicle ready light when an engine or electric driven hybrid powertrain of said vehicle is enabled, and at least one of the following conditions is sensed:
        the vehicle is in park mode or neutral mode;
        an engine RPM speed of said vehicle is below a predetermined RPM value; and
        a wheel speed of said vehicle is below a predetermined wheel speed; and
    maintaining the vehicle ready light in a non-illuminated condition when none of the conditions are met or extinguishing said ready light when none of the conditions are sensed.

2. The control method of claim 1 wherein said illuminating said vehicle ready light comprises illuminating said vehicle ready light when said powertrain of said vehicle is enabled and said vehicle is in park mode or neutral mode.

3. The control method of claim 1 wherein said illuminating said vehicle ready light comprises illuminating said vehicle ready light when said powertrain of said vehicle is enabled and said engine RPM speed of said vehicle is below said predetermined RPM value.

4. The control method of claim 3 wherein said illuminating said vehicle ready light comprises illuminating said vehicle ready light when said powertrain of said vehicle is enabled and said engine RPM speed of said vehicle is below about 500 RPM.

5. The control method of claim 1 wherein said illuminating said vehicle ready light comprises illuminating said vehicle ready light when said powertrain of said vehicle is enabled and said wheel speed of said vehicle is below said predetermined wheel speed.

6. The control method of claim 5 wherein said illuminating said vehicle ready light comprises illuminating said vehicle ready light when said powertrain of said vehicle is enabled and said wheel speed of said vehicle is below about 3 mph.

7. The control method of claim 1 wherein said illuminating said vehicle ready light comprises illuminating said vehicle ready light when said powertrain of said vehicle is enabled and said vehicle is in park mode or neutral mode, said engine RPM speed of said vehicle is below said predetermined RPM value and said wheel speed of said vehicle is below said predetermined wheel speed.

8. The control method of claim 7 wherein said illuminating said vehicle ready light comprises illuminating said vehicle ready light when said powertrain of said vehicle is enabled and said vehicle is in park mode or neutral mode, said engine RPM speed of said vehicle is below about 500 RPM and said wheel speed of said vehicle is below about 3 mph.

9. A control method for a vehicle ready light of a vehicle, comprising:
providing a vehicle having a vehicle ready light, said vehicle ready light indicating whether said vehicle is ready to be operated;
initiating operation of said vehicle by enabling a engine or electric driven hybrid powertrain of said vehicle;
illuminating said vehicle ready light for a predetermined time interval;
maintaining illumination of said vehicle ready light after said predetermined time interval when said powertrain of said vehicle is enabled and at least one of the following conditions is sensed:
said vehicle is in park mode or neutral mode;
an engine RPM speed of said vehicle is below a predetermined RPM value; and
a wheel speed of said vehicle is below a predetermined wheel speed; and
maintaining the vehicle ready light in a non-illuminated condition when none of the conditions are sensed.

10. The control method of claim 9 wherein said maintaining illumination of said vehicle ready light comprises maintaining illumination of said vehicle ready light when said powertrain of said vehicle is enabled and said vehicle is in park mode or neutral mode.

11. The control method of claim 9 wherein said maintaining illumination of said vehicle ready light comprises maintaining illumination of said vehicle ready light when said powertrain of said vehicle is enabled and said engine RPM speed of said vehicle is below said predetermined RPM value.

12. The control method of claim 11 wherein said maintaining illumination of said vehicle ready light comprises maintaining illumination of said vehicle ready light when said powertrain of said vehicle is enabled and said engine RPM speed of said vehicle is below about 500 RPM.

13. The control method of claim 9 wherein said maintaining illumination of said vehicle ready light comprises maintaining illumination of said vehicle ready light when said powertrain of said vehicle is enabled and said wheel speed of said vehicle is below said predetermined wheel speed.

14. The control method of claim 13 wherein said maintaining illumination of said vehicle ready light comprises maintaining illumination of said vehicle ready light when said powertrain of said vehicle is enabled and said wheel speed of said vehicle is below about 3 mph.

15. The control method of claim 9 wherein said maintaining illumination of said vehicle ready light comprises maintaining illumination of said vehicle ready light when said powertrain of said vehicle is enabled and said vehicle is in park mode or neutral mode, said engine RPM speed of said vehicle is below said predetermined RPM value and said wheel speed of said vehicle is below said predetermined wheel speed.

16. The control method of claim 15 wherein said maintaining illumination of said vehicle ready light comprises maintaining illumination of said vehicle ready light when said powertrain of said vehicle is enabled and said vehicle is in park mode or neutral mode, said engine RPM speed of said vehicle is below about 500 RPM and said wheel speed of said vehicle is below about 3 mph.

17. A control method for a vehicle ready light of a vehicle, said vehicle ready light indicating whether said vehicle is ready to be operated, comprising the steps of:
turning the vehicle on;
illuminating the vehicle ready light when a engine or electric driven hybrid powertrain of the vehicle is enabled, and when at least one of the following conditions is sensed:
the vehicle is in park mode or neutral mode;
an engine RPM speed of the vehicle is below a predetermined RPM value; and
a wheel speed of the vehicle is below a predetermined wheel speed; and
maintaining the vehicle ready light in a non-illuminated condition when none of the conditions are sensed.

18. The method of claim 17 wherein said illuminating said vehicle ready light comprises illuminating said vehicle ready light when said powertrain of said vehicle is enabled and said vehicle is in park mode or neutral mode.

19. The method of claim 17 wherein said illuminating said vehicle ready light comprises illuminating said vehicle ready light when said powertrain of said vehicle is enabled and said engine RPM speed of said vehicle is below said predetermined RPM value.

20. The method of claim 17 wherein said illuminating said vehicle ready light comprises illuminating said vehicle ready light when said powertrain of said vehicle is enabled and said engine RPM speed of said vehicle is below about 500 RPM.

* * * * *